(12) United States Patent
Watts et al.

(10) Patent No.: US 6,275,832 B1
(45) Date of Patent: Aug. 14, 2001

(54) PROVIDING TRANSACTION UNDO WITHOUT LOGGING

(75) Inventors: Julie Ann Watts; Steven John Watts, both of Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,438

(22) Filed: Sep. 21, 1998

(51) Int. Cl.[7] .................................................. G06F 17/30
(52) U.S. Cl. ............................................ 707/203; 707/202
(58) Field of Search .............................. 714/19; 707/201, 707/202, 204, 2, 203

(56) References Cited

U.S. PATENT DOCUMENTS

| | | | |
|---|---|---|---|
| 5,335,343 | * | 8/1994 | Lampson et al. ................ 714/19 |
| 5,455,946 | * | 10/1995 | Mohan et al. .................... 707/202 |
| 5,748,952 | * | 5/1998 | Chadha et al. ................... 707/2 |
| 5,845,274 | * | 12/1998 | Chadha et al. ................... 707/2 |
| 5,897,641 | * | 4/1999 | Ruddy et al. .................... 707/202 |
| 5,903,898 | * | 5/1999 | Cohen et al. .................... 707/204 |
| 6,098,075 | * | 8/2000 | Becraft, Jr. et al. .............. 707/201 |
| 6,173,292 | * | 1/2001 | Barber et al. .................... 707/200 |
| 6,182,086 | * | 1/2001 | Lomet et al. ..................... 707/202 |
| 6,185,577 | * | 2/2001 | Nainani et al. ................... 707/202 |
| 6,185,699 | * | 2/2001 | Haderle et al. ................... 714/19 |

OTHER PUBLICATIONS

Biliris et al., "Transactions in the Client–Server EOs Object Store," Data Engineering, IEEE, pp. 308–315, Mar. 6, 1995.*

Yu et al., "Transaction Management for a Distributed Object Storage System WAKASHI—Design, Implementation and Performance," IEEE, pp. 460–468, 1996.*

* cited by examiner

Primary Examiner—Thomas Black
Assistant Examiner—Charles L. Rones
(74) Attorney, Agent, or Firm—Ingrid M. Foerster

(57) ABSTRACT

A technique for undoing a transaction that changes data in a database. In accordance with the present invention, the database contains at least one data unit. The database is stored in a data storage device connected to a computer. A lock, transaction identifier, transaction operation indicator, and data unit, are associated with the transaction. The invention undoes the transaction using the associated lock, transaction identifier, transaction operation indicator, and data unit.

57 Claims, 4 Drawing Sheets

PROVIDING TRANSACTION UNDO WITHOUT LOGGING

BACKGROUND OF THE INVENTION

1. Field of the Invention

This invention relates in general to computer-implemented database systems, and, in particular, to providing transaction undo without logging.

2. Description of Related Art

Database management systems (DBMSs) are computerized information storage and retrieval systems. Relational database management systems (RDBMSs) are DBMSs that store and retrieve data that is organized as tables. A table consists of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

The mechanism by which table data is mapped to physical storage on DASD is DBMS-specific. A common mechanism is through assignment of a table to a tablespace, where a tablespace is a named collection of one or more datasets. Each tablespace is physically divided into equal units called pages, and each page contains one or more tuples of data (full or partial) and/or control information.

As data changes or significant events occur, DBMSs commonly record the occurrences on a recovery log. For example, when a change is made to a row, enough information is written on the log to be able to construct the before-update version of the row from its after-update appearance, and vice versa.

Constructing the before-update version of a row from its after-update appearance and the log is referred to as undo processing. It is the basis by which many DBMSs provide transaction atomicity. Consider a transaction which fails after making some updates, but before reaching a point of consistency. By performing undo processing, the updates made by the failed transaction can be backed out to restore data to its previous point of consistency.

Constructing the after-update version of a row from its before-update appearance and the log is referred to as redo processing. It is a basis by which DBMSs that employ write ahead logging can ensure that committed data is not lost upon system failure. Consider a transaction which fails after committing some updates but before the committed data is written to non-volatile media. By performing redo processing during restart of the system, the missing updates are restored and commit semantics preserved.

Redo processing is also the basis by which many DBMSs provide media recovery. Databases are generally stored on non-volatile data storage devices. Although non-volatile, the media is still vulnerable to damage. Damage to the media is usually referred to as media failure, and restoration of data after media failure is usually referred to as media recovery. A common method of providing media recovery relies on the user periodically making copies of the database onto non-volatile storage and registering those copies with the DBMS. Upon suffering a media failure, the DBMS provides media recovery by installing a copy of the database and performing redo log apply processing against the copy.

To improve transaction performance and reduce log volume, users have expressed a willingness to forego data recoverability and persistence across failure for their less valuable data. Backout capability, however, is still desired. This concession removes from a DBMS the need to perform redo logging for the pertinent data objects, but does not remove, under current art, the need for undo logging. To remove the need for undo logging, there is a need in the art for providing transaction undo without logging.

SUMMARY OF THE INVENTION

To overcome the limitations in the prior art described above, and to overcome other limitations that will become apparent upon reading and understanding the present specification, the present invention discloses a technique for undoing a transaction that changes data in a database.

In accordance with the present invention, the database contains at least one data unit. The database is stored in a data storage device connected to a computer. A lock, transaction identifier, transaction operation indicator, and data unit, are associated with the transaction. The invention undoes a transaction using the associated lock, transaction identifier, transaction operation indicator, and data unit.

An objective of an embodiment of the invention is to provide transaction undo following application failure or request for rollback. Another objective of an embodiment of the invention is to provide inflight transaction backout following system failure in which lock information is not lost.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The preferred embodiment of the invention applies to situations in which transaction locks are held by or on behalf of a transaction requiring undo. In accordance with the present invention, transactions are assigned transaction identifiers, e.g. transaction identification numbers (IDs). When a lock is acquired by a transaction to perform an operation that changes data in the database, the transaction ID is associated with the lock. The transaction ID and a transaction operation indicator, such as a bit is also associated with the modified data row in the database. The reversal of changes made by a transaction (i.e., transaction undo) is accomplished based upon the above information and the rules of operation provided by the invention.

Hardware Environment

Figure 1:
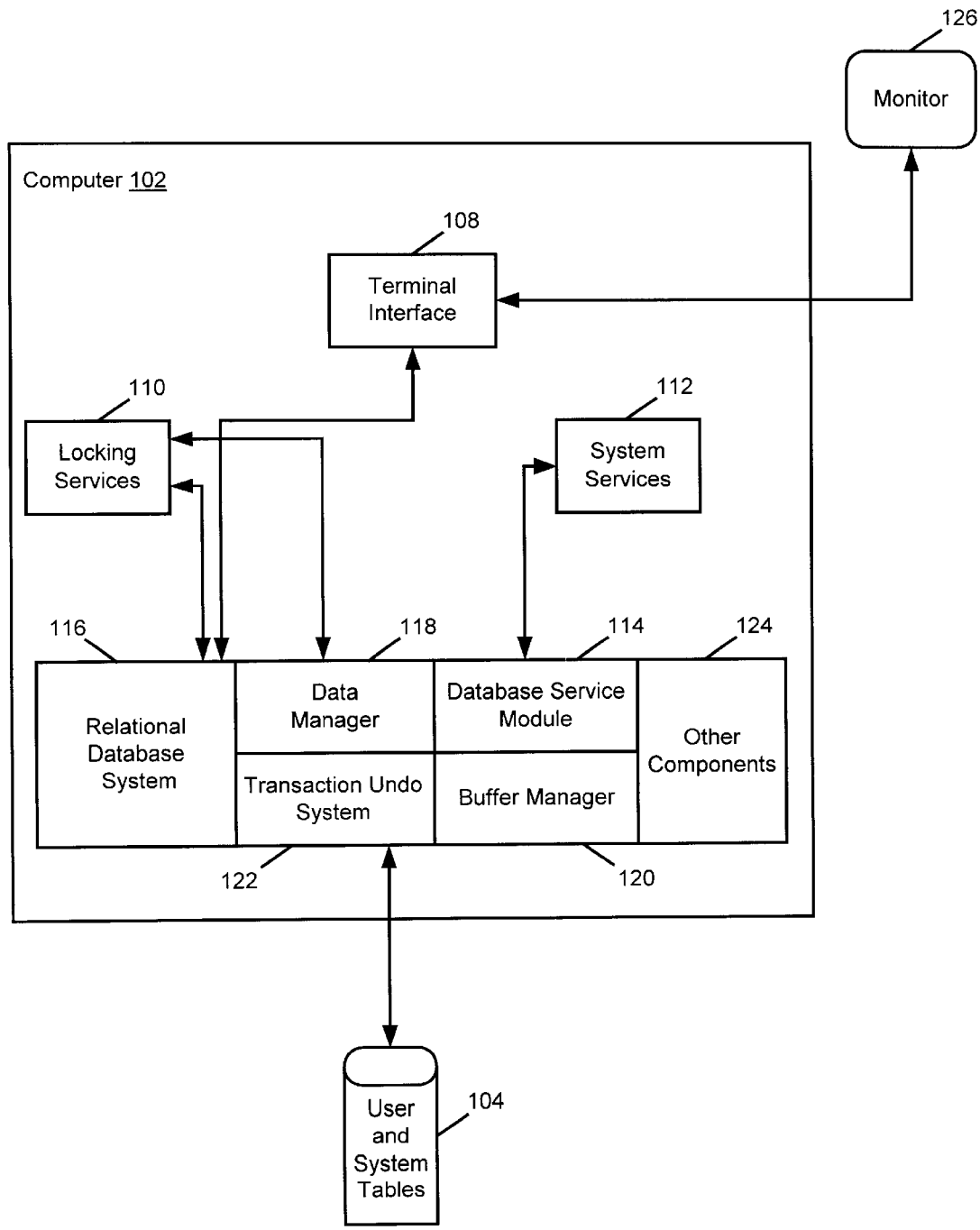
FIG. 1 illustrates an exemplary computer hardware environment that could be used in accordance with the preferred embodiment of the present invention.

FIG. 1 illustrates an exemplary computer hardware environment that could be used in accordance with the present invention. In the exemplary environment, a computer system 102 is comprised of one or more processors connected to one or more data storage devices 104 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® architecture for the MVS® operating system includes three major components: the Internal Resource Lock Manager (IRLM) 110, the Systems Services module 112, and the Database Services module 114. The IRLM 110 handles locking services for the DB2® architecture, which treats data as a shared resource, thereby allowing any number of users to access the same data simultaneously. Thus concurrency control is required to isolate users and to maintain data integrity. The Systems Services module 112 controls the overall DB2® execution environment, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120, the Transaction Undo System 122, and other components 124. The Transaction Undo System 122 works with the components of the computer system 102 to undo transactions that change data in a database.

The present invention is generally implemented using SQL statements executed under the control of the Database Services module 114. The Database Services module 114 retrieves or receives the SQL statements, wherein the SQL statements are generally stored in a text file on the data storage device 104 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage device 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Providing Transaction Undo Without Logging

Typically, every transaction performed within a DBMS has an associated transaction ID. In the preferred embodiment of the present invention, transaction IDs are unique among active and inactive transactions. (The invention requires only that transaction IDs be unique among active transactions. That is, once a transaction completes, its ID may be reused by a later transaction.)

Figure 2:
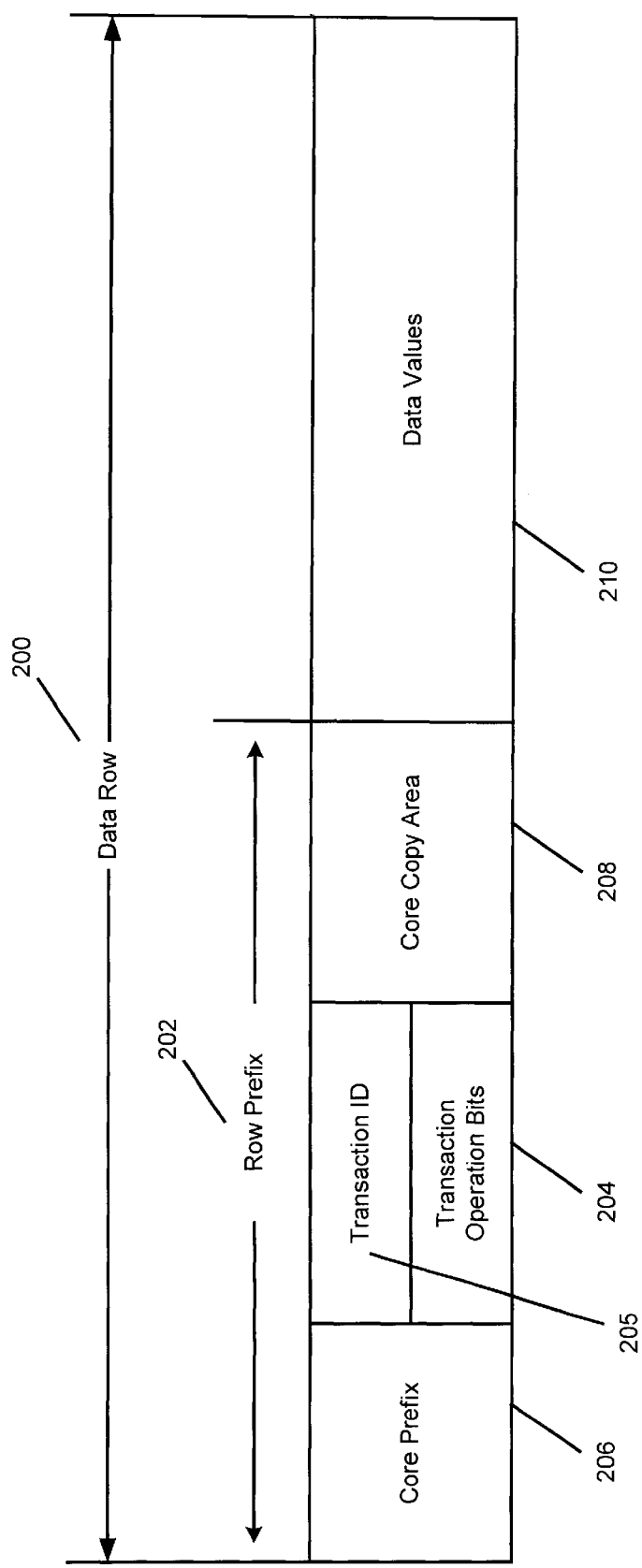
FIG. 2 illustrates an exemplary data row in accordance with the preferred embodiment of the present invention.

FIG. 2 displays an exemplary data row 200. It is composed of a row prefix 202 followed by data values 210 for the columns that comprise the row. In accordance with the present invention, the row prefix 202 contains the Transaction ID 205 of the last transaction to modify the data row 200. The Transaction ID 205 is also stored with the transaction lock acquired to protect the update. The following information is also stored in the row prefix 202 of a data row 200:

Transaction operation identifiers to indicate the operation (s) performed on the row 200 by the transaction whose ID is in the prefix 202. Transaction operations include update, insert and delete operations. In the preferred embodiment, transaction operation identifiers comprise transaction operation bits 204, although operations may be identified by other means. The row prefix 202 contains a bit for each of the update, insert, and delete operations.

Core prefix information 206 typically composed of the following:

Bits or other indicators of whether the data row 200 is a base, pointer or overflow record. A base record (also referred to as a base row) is a standard row. When a row is inserted into a table, it is inserted as a base record. Prior art teaches that upon update of a row, such that the new values will not fit on the page containing the old row, the new row is inserted on a new page and is tagged as an overflow record in the prefix 202. The old row is tagged as a pointer record or pointer row in its prefix 202 and is made to point to the newly inserted (overflow) record or row. Traditionally, the space occupied by the old row, beyond that required to form the pointer record, is freed.

Any other information of interest to the DBMS, such as the length of the row 200.

A copy 208 of the core prefix information 206 as it existed before the transaction whose ID is in the prefix 202 made its first update to the data row 200.

The present invention dictates the following rules of operation for transactions with unique transaction IDs 205.

Insert: When a data record is inserted, the Transaction ID 205 of the inserting transaction is placed in the row prefix 202 and the insert indicator, e.g. bit in the prefix set, e.g. is turned on.

Delete: When a data record is deleted, it is only a pseudo-delete (flag-delete) that is performed, i.e., the record is marked "deleted" (the delete indicator, e.g. bit in the row prefix 202 is set, e.g. turned on), but the data record remains on the page. The Transaction ID 205 of the deleting transaction is placed in the row prefix 202.

Update: The update operation can be applied to a base data record or a record represented by a pointer record plus an overflow record. When a base data record is updated, it is always updated to a pointer record plus an overflow record:

The overflow record is inserted, preferably onto the same page as the original record. The Transaction ID 205 of the updating transaction is put into the overflow row prefix 202 and the insert indicator in the prefix is set.

If this is the first update made to the data row 200 by this transaction, the core prefix area 206 of the original record is copied to the core-copy area 208 of the prefix 202 (the insert indicator in the prefix of the base record identifies the first update). The core prefix area 206 is then updated to a pointer record format: it is made to point to the newly inserted overflow record and the pointer record indicator is set. The Transaction ID 205 of the updating transaction is put in the pointer record prefix and the update indicator in the prefix is set. The space beyond the pointer record prefix (occupied by the original data values) is not freed.

When a record that is represented by a pointer record plus an overflow record is updated, it is either updated to a modified pointer record plus a new overflow record, or it is collapsed back into a base record. Such a record can be collapsed into a base record by any one update made by a transaction (provided there is space for the base record on the pointer record page, and that such a record began the transaction as a pointer plus an overflow record). The operation of collapse is as follows:

The original overflow record is pseudo-deleted (see the discussion of delete above).

If this is the first update made to the data row 200 by this transaction, the original pointer record's core prefix area is copied to the pointer record's core-copy area of the prefix. The pointer record's core prefix area is then updated to a base record format. The Transaction ID 205 of the updating transaction is put into the base record prefix 202, and the update indicator in the base record prefix 202 is set.

The operation of non-collapse is as follows:

The original overflow record is pseudo-deleted (see the discussion of delete above).

The new overflow record is inserted, preferably onto the same page as the pointer record. The Transaction ID 205 of the updating transaction is put into the overflow record prefix, and the insert indicator in the prefix is set.

If this is the first update made to the data row 200 by this transaction, the core prefix area of the pointer record is copied to the core-copy area of the prefix. The core prefix area is then updated to point to the new overflow record. The transaction ID 205 of the updating transaction is put into the pointer record prefix and the update indicator in the prefix is set. The space beyond the pointer record prefix (if any) is not freed.

For non-unique IDs, additional processing is required. When a system failure occurs, both the IDs and held locks drive the location and undo of data changes. If IDs are non-unique and a committed transaction has the same ID as an inflight transaction requiring a backout, the additional processing prevents the inflight transactions from undoing the committed transaction's changes. An inflight transaction is a transaction that has not been completed.

For example, suppose a first transaction 'George' updates row 10 and commits the update. Then, a second transaction 'George' locks row 10 to update it. Before the second transaction is committed, a system crash occurs. The lock held by the second transaction 'George' cannot be allowed to drive the backout of the update performed by the first transaction 'George'. Additional processing during insert, update and delete operations are necessary to prevent such a corruption of the database. The present invention dictates the following rules of operation for transactions with non-unique IDs.

Insert: Additional processing is required for insert only if page level locking is being used. Before attempting to lock a page for insert, insert must check to see if the transaction ID in the page matches its own. If so, and if the insert transaction is not known to be the lock owner, it may be an accidental match. A test-lock is performed to see if insert is indeed the lock owner. If not, the page must be cleaned and forced. Page cleaning consists of zeroing the transaction ID in the page header and in all record prefixes on the page, resetting (e.g. zeroing) the insert/update/delete indicators (bits) in all record prefixes on the page, and resetting (e.g. zeroing) the core-copy area in all record prefixes on the page. If the transaction ID on the page does not match that of the insert, the page must be cleaned (in case some rows have an accidental match to the insert transaction ID), but the page need not be forced. Forcing a page consists of writing page to non-volatile storage.

Update: Page cleanup under page level locking is as for insert. Under row level locking, Update must perform additional cleanup, as follows:

Before taking the transaction row lock, if the Transaction ID 205 in the record prefix 202 matches that of the current transaction, but it is not known that the current transaction already holds the row lock, it may be an accidental match. A test-lock is performed to see if the current transaction holds the lock. If not, the row is cleaned and the page forced.

Delete: Page and row cleanup are as for Update.

The preferred embodiment of the present invention considers situations such as partial transaction operations, rollback/abort, and backward recovery from system failure. Frequently, partial transactions occur when the system fails before the transaction is completed. For example, an insert, delete or update operation may involve making several modifications to a data page. If a system failure occurs when some, but not all of the modifications have been performed, the page is in an inconsistent state and a partial transaction exists. This makes standard backout processing difficult.

Different DBMSs have different ways of dealing with this situation. Typically, the partial operation is removed prior to performing standard backout processing.

A method for dealing with failure in the middle of insert involves performing the steps below:

Making a copy of the page prior to insert.
In the original page:
    Setting, e.g., Turning on a "page broken" bit or other indicator.
    Making the data page changes.
    Resetting, e.g., Turning off the "page broken" indicator (bit).

If a system failure occurs during an insert that requires several modification to a page, it can be trapped and the "page broken" indicator interrogated. If the page broken indicator is not set, the page is consistent and standard transaction backout can be performed. Otherwise, if the page broken indicator is set, the failure occurred before the insert completed. This partial insert to the page must be removed prior to performing standard transaction backout. The standard backout involves backing out the completed transaction activities. Removing the partial insert restores the page copy that was made prior to starting the insert operation.

The preferred embodiment of the present invention also considers rollback and abort. Rollback and abort of a transaction proceed as follows. The locks held by the aborting transaction are interrogated and processed in any order. For example, the list of held locks can be sorted by resource name to provide locality of reference during subsequent processing; the list may be divided among several tasks to achieve parallel processing; etc.

The row locks and page locks are processed as follows. For each held row lock, the row 200 is located. If the row 200 corresponding to the lock does not exist, no action is taken. This scenario exists when a row lock is acquired to perform an insert and a backout is invoked prior to the insert being performed. If the transaction ID 205 in the record prefix 202 matches the transaction ID carried with the lock, there is backout work to perform for this transaction on this row. The transaction operation bits 204 in the row prefix 202 are interrogated and backout is performed according to the rollback chart 300 in FIG. 3.

Similarly, for each held page lock, the locked page is located. If the page corresponding to the page lock does not exist, or is unformatted, no action is taken. This scenario exists when a backout action occurs after lock acquisition and before format and use of the page. Otherwise, if the page exists, there is backout work to be performed for the transaction on this page. The Transaction ID 205 of each row 200 on the page is interrogated. For those IDs that match the Transaction ID 205 of the transaction being backed out, the transaction operation bits 204 in the row prefix 202 are also interrogated. Backout actions are performed according to the rollback chart 300 in FIG. 3.

Figure 3:
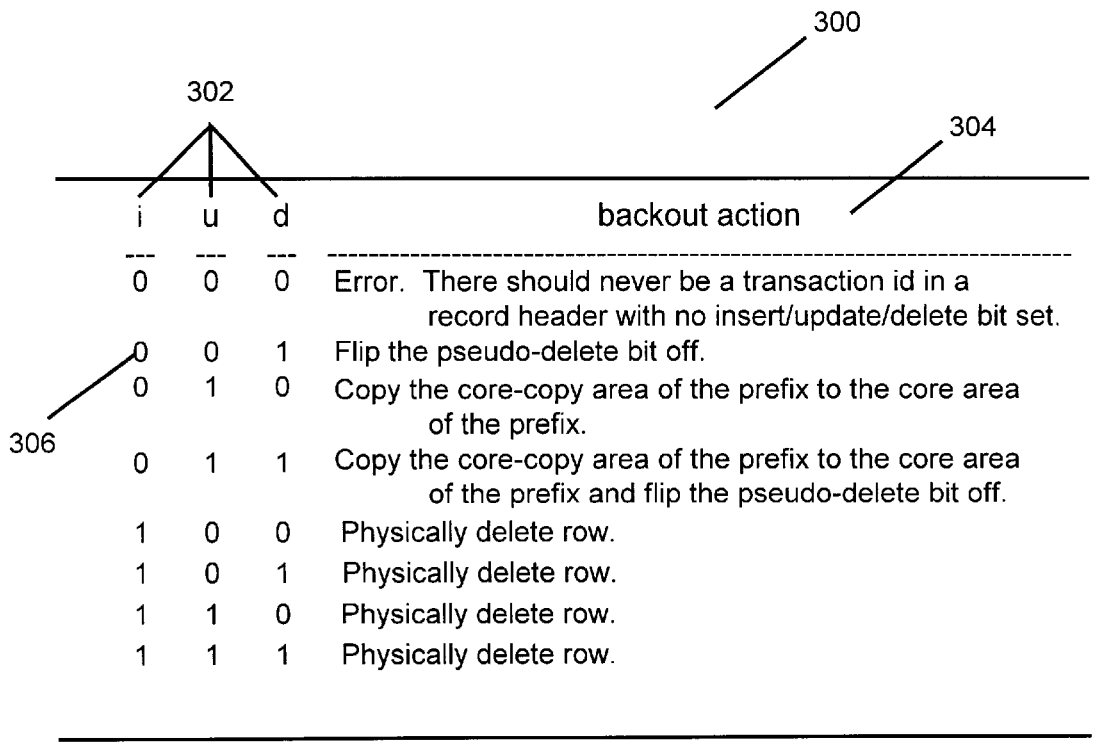
FIG. 3 illustrates an exemplary rollback backout action chart in accordance with the preferred embodiment of the present invention.

FIG. 3 illustrates an exemplary backout action according to the preferred embodiment of the present invention. On the left side of the rollback chart 300, the letters "i", "u", and "d" 302 represent insert, update, and delete, respectively. On the right side of the rollback chart 300, a detailed description of the backout action 304 is listed for a given transaction operation bit 204 setting. For example, in the second line 306 of the rollback chart 300, i=0, u=0, and d=1. The corresponding backout action 304 is "reset the pseudo-delete indicator".

The preferred embodiment of the present invention also considers backward recovery from system failure (inflight transaction backout). This type of database recovery is similar in operation to rollback and abort. The difference is that there may be many transactions to backout, and the associated transaction IDs 205 are unavailable Thus, rather than interrogate the row or page locks held by a named transaction, the retained locks held by the restarting system are interrogated. The locks are then processed. The processing is similar to processing performed during rollback and abort. However, only locks that carry non-zero transaction IDs are processed. Locks that carry zero transaction IDs are skipped. A zero transaction ID indicates a non-exclusive transaction lock that was nonetheless retained as exclusive. This non-exclusive ID does not protect an insert, update or delete operation and can be ignored.

Figure 4:
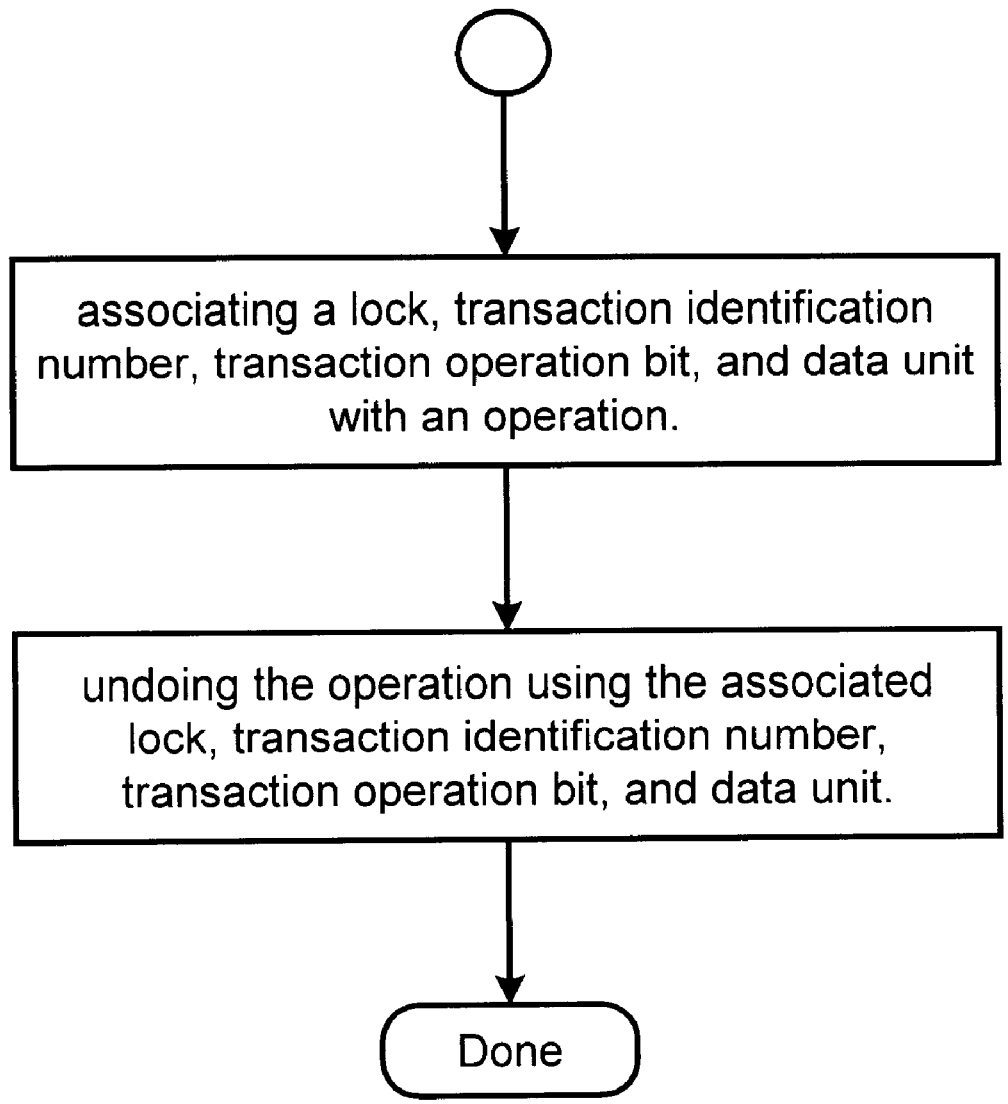
FIG. 4 is a flow diagram illustrating the steps performed to provide transaction undo without logging in accordance with the preferred embodiment of the present invention.

FIG. 4 is a flow chart illustrating the logic performed by preferred embodiments of the present invention. Block 400 represents the present invention associating a lock, transaction identifier, transaction operation indicator, and data unit with an operation. Block 402 represents the present invention undoing the operation using the associated lock, transaction identifier, transaction operation indicator, and data unit.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with embodiments of the present invention.

In summary, the preferred embodiment of the present invention discloses a technique for transaction undo without logging. The present invention provides undoing a transaction that changes data in a database without logging.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for undoing a transaction that changes data in a database, the database having at least one data unit, wherein the database is stored in a data storage device connected to a computer, the method comprising the steps of:

associating a lock, transaction identifier, transaction operation indicator, and data unit with the transaction; and undoing the transaction by interrogating the associated lock, and using the transaction identifier, transaction operation indicator, and data unit.

2. The method of claim 1, wherein the transaction comprises one operation.

3. The method of claim 1, wherein the lock is for a row having a prefix, wherein the prefix contains a core prefix area, a core copy prefix area, the associated transaction operation indicator, and the associated transaction identifier.

4. The method of claim 1, wherein the transaction comprises at least one insert operation, the method further comprises the steps of:

using the at least one insert operation to insert a new row into the database, wherein the new row has a prefix, and wherein the insert operation comprises:

setting the associated transaction operation indicator in the prefix of the new row; and storing the associated transaction identifier in the prefix of the new row.

5. The method of claim 4, wherein the method further comprises the step of performing a transaction backout, wherein performing the transaction backout comprises backing out the at least one insert operation by deleting the new row from the database.

6. The method of claim 1, wherein the transaction comprises at least one delete operation, the method further comprises the steps of:
using the at least one delete operation to delete a selected row from the database, the selected row having a prefix, wherein the delete operation comprises:
setting the associated transaction operation indicator in the prefix of the selected row; and
storing the associated transaction identifier in the prefix of the selected row.

7. The method of claim 6, wherein the method further comprises the step of performing a transaction backout, wherein performing the transaction backout comprises backing out the at least one delete operation by turning off the associated transaction operation indicator in the prefix of the selected row.

8. The method of claim 1, wherein the transaction comprises at least one update operation for updating a base row, the method further comprises the steps of:
inserting an overflow row into the database, wherein the overflow row contains one or more new values and the overflow row has a prefix;
storing the associated transaction identifier in the prefix of the overflow row;
setting the associated transaction operation indicator in the prefix of the overflow row;
pointing the base row at the overflow row, wherein the base row has a prefix, the prefix of the base row having a core prefix area and a core copy prefix area;
storing the associated transaction identifier in the prefix of the base row; and
setting the transaction indicator in the prefix area of the base row.

9. The method of claim 8, wherein the method further comprises the step of on a first update operation, storing the core prefix area of the base row in the core copy prefix area of the base row.

10. The method of claim 8, wherein the method further comprises the steps of:
performing a transaction backout, wherein performing the transaction backout comprises backing out the at least one update operation by copying the core copy prefix area of the base row to the core prefix area of the base row; and
deleting the inserted overflow row.

11. The method of claim 1, wherein the database comprises one or more rows and the transaction comprises at least one update operation for updating each row, each row being represented by a pointer row plus an overflow row, wherein the pointer row has a core prefix area and a core copy prefix area, the method further comprises the steps of:
deleting the overflow row from the database, wherein the overflow row has a prefix;
converting the pointer row into a base row in the database, wherein the base row has a prefix;
storing the associated transaction identifier in the prefix of the base row; and
setting the transaction indicator in the prefix area of the base row.

12. The method of claim 11, wherein the method further comprises the step of on a first update operation, storing the core prefix area of the pointer row in the core copy prefix area of the pointer row.

13. The method of claim 11, wherein the step of deleting comprises the following steps:
storing the associated transaction identifier in the prefix of the overflow row; and
setting the associated transaction operation indicator in the prefix of the overflow row.

14. The method of claim 1, wherein the database comprises one or more rows and the transaction comprises at least one update operation for updating each row, each row being a pointer row plus an overflow row the method further comprises the steps of:
deleting the overflow row from the database, wherein the overflow row has a prefix;
inserting a new overflow row into the database, wherein the new overflow row contains at least one new value, and wherein the new overflow row has a prefix;
storing the associated transaction identifier in the prefix of the new overflow row;
setting the associated transaction operation indicator in the prefix of the new overflow row;
pointing the pointer row at the new overflow row, wherein the pointer row has a prefix;
storing the associated transaction identifier in the prefix of the pointer row; and
setting the transaction indicator in the prefix area of the pointer row.

15. The method of claim 14, wherein the step of deleting the overflow row comprises the following steps:
storing the associated transaction identifier in the prefix of the overflow row; and
setting the associated transaction operation indicator in the prefix of the overflow row.

16. The method of claim 14, wherein the pointer row has core prefix area and a core copy prefix area, and wherein the method further comprises the step of on a first update operation, storing the core prefix area of the pointer row in the core copy prefix area of the pointer row.

17. The method of claim 1, wherein the lock is for a page having a header, wherein the header contains the transaction identifier.

18. The method of claim 1, wherein the transaction identifier is a unique transaction identifier.

19. The method of claim 1, wherein the transaction comprises a first operation with a first identifier and a second operation with a second identifier, and the first identifier equals the second identifier, the method further comprising, after system failure, preventing the second operation from undoing changes made to the first operation.

20. An apparatus for undoing a transaction that changes data in a database, comprising:
a computer having a data storage device connected thereto, wherein the data storage device stores a database having at least one data unit; and
one or more computer programs, performed by the computer, for associating a lock, transaction identifier, transaction operation indicator, and data unit with the transaction, and by interrogating the associated lock, and using the transaction identifier, transaction operation indicator, and data unit to undo the transaction.

21. The apparatus of claim 20, wherein the transaction comprises one operation.

22. The apparatus of claim 20, wherein the lock is for a row having a prefix, wherein the prefix contains a core prefix area, a core copy prefix area, the associated transaction operation indicator, and the associated transaction identifier.

23. The apparatus of claim 20, wherein the transaction comprises at least one insert operation, the apparatus further comprises:
one or more computer programs, performed by the computer, for using the at least one insert operation to insert a new row into the database, wherein the new row has a prefix, and wherein the insert operation comprises: setting the associated transaction operation indicator in the prefix of the new row, and storing the associated transaction identifier in the prefix of the new row.

24. The apparatus of claim 23, wherein the apparatus further comprises one or more computer programs, performed by the computer, for performing a transaction backout, wherein performing the transaction backout comprises backing out the at least one insert operation by deleting the new row from the database.

25. The apparatus of claim 20, wherein the transaction comprises at least one delete operation, the apparatus further comprises:
one or more computer programs, performed by the computer, for using the at least one delete operation to delete a selected row from the database, the selected row having a prefix, wherein the delete operation comprises: setting the associated transaction operation indicator in the prefix of the selected row, and storing the associated transaction identifier in the prefix of the selected row.

26. The apparatus of claim 25, wherein the apparatus further comprises:
one or more computer programs, performed by the computer, for performing a transaction backout, wherein performing the transaction backout comprises backing out the at least one delete operation by turning off the associated transaction operation indicator in the prefix of the selected row.

27. The apparatus of claim 20, wherein the transaction comprises at least one update operation for updating a base row, the apparatus further comprises:
one or more computer programs, performed by the computer, for inserting an overflow row into the database, wherein the overflow row contains one or more new values and the overflow row has a prefix, storing the associated transaction identifier in the prefix of the overflow row, setting the associated transaction operation indicator in the prefix of the overflow row, pointing the base row at the overflow row, wherein the base row has a prefix, the prefix of the base row having a core prefix area and a core copy prefix area, storing the associated transaction identifier in the prefix of the base row, and setting the transaction indicator in the prefix area of the base row.

28. The apparatus of claim 27, wherein the apparatus further comprises means, performed by the computer for on a first update operation, storing the core prefix area of the base row in the core copy prefix area of the base row.

29. The apparatus of claim 27, wherein the apparatus further comprises:
one or more computer programs, performed by the computer, for performing a transaction backout, wherein performing the transaction backout comprises backing out the at least one update operation by copying the core copy prefix area of the base row to the core prefix area of the base row, and deleting the inserted overflow row.

30. The apparatus of claim 20, wherein the database comprises one or more rows and the transaction comprises at least one update operation for updating each row, each row being represented by a pointer row plus an overflow row, wherein the pointer row has a core prefix area and a core copy prefix area, the apparatus further comprises:
one or more computer programs, performed by the computer, for deleting the overflow row from the database, wherein the overflow row has a prefix, converting the pointer row into a base row in the database, wherein the base row has a prefix, storing the associated transaction identifier in the prefix of the base row, and setting the transaction indicator in the prefix area of the base row.

31. The apparatus of claim 30, wherein the apparatus further comprises one or more computer programs, performed by the computer, for on a first update operation, storing the core prefix area of the pointer row in the core copy prefix area of the pointer row.

32. The apparatus of claim 30, wherein deleting comprises one or more computer programs, performed by the computer, for storing the associated transaction identifier in the prefix of the overflow row, and setting the associated transaction operation indicator in the prefix of the overflow row.

33. The apparatus of claim 20, wherein the database comprises one or more rows and the transaction comprises at least one update operation for updating each row, each row being a pointer row plus an overflow row the apparatus further comprises:
one or more computer programs, performed by the computer, for deleting the overflow row from the database, wherein the overflow row has a prefix, inserting a new overflow row into the database, wherein the new overflow row contains at least one new value, and wherein the new overflow row has a prefix, storing the associated transaction identifier in the prefix of the new overflow row, setting the associated transaction operation indicator in the prefix of the new overflow row, pointing the pointer row at the new overflow row, wherein the pointer row has a prefix, storing the associated transaction identifier in the prefix of the pointer row, and setting the transaction indicator in the prefix area of the pointer row.

34. The apparatus of claim 33, wherein deleting the overflow row comprises:
one or more computer programs, performed by the computer, for storing the associated transaction identifier in the prefix of the overflow row, and setting the associated transaction operation indicator in the prefix of the overflow row.

35. The apparatus of claim 33, wherein the pointer row has core prefix area and a core copy prefix area, and wherein the method further comprises one or more computer programs, performed by the computer, for on a first update operation, storing the core prefix area of the pointer row in the core copy prefix area of the pointer row.

36. The apparatus of claim 20, wherein the lock is for a page having a header, wherein the header contains the transaction identifier.

37. The apparatus of claim 20, wherein the transaction identifier is a unique transaction identifier.

38. The apparatus of claim 20, wherein the transaction comprises a first operation with a first transaction identifier and a second operation with a second transaction identifier, and the first transaction identifier equals the second transaction identifier, the apparatus further comprising the means for, after system failure, preventing the second operation from undoing changes made to the first operation.

39. An article of manufacture comprising a computer program carrier readable by a computer and embodying one or more instruction executable by the computer to perform method steps for undoing an transaction that changes data in a database, the database having at least one data unit, wherein the database is stored in a data storage device connected to the computer, the method comprising the steps of:

associating a lock, transaction identifier, transaction operation indicator, and data unit with the transaction; and undoing the transaction by interrogating the associated lock, and using the transaction identifier, transaction operation indicator, and data unit.

40. The article of manufacture of claim 39, wherein the transaction comprises one operation.

41. The article of manufacture of claim 39, wherein the lock is for a row having a prefix, wherein the prefix contains a core prefix area, a core copy prefix area, the associated transaction operation indicator, and the associated transaction identifier.

42. The article of manufacture of claim 39, wherein the transaction comprises at least one insert operation, the method further comprises the steps of:

using the at least one insert operation to insert a new row into the database, wherein the new row has a prefix, and wherein the insert operation comprises:
setting the associated transaction operation indicator in the prefix of the new row; and
storing the associated transaction identifier in the prefix of the new row.

43. The article of manufacture of claim 42, wherein the method further comprises the step of performing a transaction backout, wherein performing the transaction backout comprises backing out the at least one insert operation by deleting the new row from the database.

44. The article of manufacture of claim 39, wherein the transaction comprises at least one delete operation, the method further comprises the steps of:

using the at least one delete operation to delete a selected row from the database, the selected row having a prefix, wherein the delete operation comprises:
setting the associated transaction operation indicator in the prefix of the selected row; and
storing the associated transaction identifier in the prefix of the selected row.

45. The article of manufacture of claim 44, wherein the method further comprises the step of performing a transaction backout, wherein performing the transaction backout comprises backing out the at least one delete operation by turning off the associated transaction operation indicator in the prefix of the selected row.

46. The article of manufacture of claim 39, wherein the transaction comprises at least one update operation for updating a base row, the method further comprises the steps of:

inserting an overflow row into the database, wherein the overflow row contains one or more new values and the overflow row has a prefix;
storing the associated transaction identifier in the prefix of the overflow row;
setting the associated transaction operation indicator in the prefix of the overflow row;
pointing the base row at the overflow row, wherein the base row has a prefix, the prefix of the base row having a core prefix area and a core copy prefix area;
storing the associated transaction identifier in the prefix of the base row; and
setting the transaction indicator in the prefix area of the base row.

47. The article of manufacture of claim 46, wherein the method further comprises the step of on a first update operation, storing the core prefix area of the base row in the core copy prefix area of the base row.

48. The article of manufacture of claim 46, wherein the method further comprises the steps of:

performing a transaction backout, wherein performing the transaction backout comprises backing out the at least one update operation by copying the core copy prefix area of the base row to the core prefix area of the base row; and
deleting the inserted overflow row.

49. The article of manufacture of claim 39, wherein the database comprises one or more rows and the transaction comprises at least one update operation for updating each row, each row being represented by a pointer row plus an overflow row, wherein the pointer row has core prefix area and a core copy prefix area, the method further comprises the steps of:

deleting the overflow row from the database, wherein the overflow row has a prefix;
converting the pointer row into a base row in the database, wherein the base row has a prefix;
storing the associated transaction identifier in the prefix of the base row; and
setting the transaction indicator in the prefix area of the base row.

50. The article of manufacture of claim 49, wherein the method further comprises the step of on a first update operation, storing the core prefix area of the pointer row in the core copy prefix area of the pointer row.

51. The article of manufacture of claim 49, wherein the step of deleting comprises the following steps:

storing the associated transaction identifier in the prefix of the overflow row; and
setting the associated transaction operation indicator in the prefix of the overflow row.

52. The article of manufacture of claim 39, wherein the database comprises one or more rows and the transaction comprises at least one update operation for updating each row, each row being a pointer row plus an overflow row the method further comprises the steps of:

deleting the overflow row from the database, wherein the overflow row has a prefix;
inserting a new overflow row into the database, wherein the new overflow row contains at least one new value, and wherein the new overflow row has a prefix;
storing the associated transaction identifier in the prefix of the new overflow row;
setting the associated transaction operation indicator in the prefix of the new overflow row;
pointing the pointer row at the new overflow row, wherein the pointer row has a prefix;
storing the associated transaction identifier in the prefix of the pointer row; and setting the transaction indicator in the prefix area of the pointer row.

53. The article of manufacture of claim 52, wherein the step of deleting the overflow row comprises the following steps:
   storing the associated transaction identifier in the prefix of the overflow row; and
   setting the associated transaction operation indicator in the prefix of the overflow row.

54. The article of manufacture of claim 52, wherein the pointer row has core prefix area and a core copy prefix area, and wherein the method further comprises the step of on a first update operation, storing the core prefix area of the pointer row in the core copy prefix area of the pointer row.

55. The article of manufacture of claim 39, wherein the lock is for a page having a header, wherein the header contains the transaction identifier.

56. The article of manufacture of claim 39, wherein the transaction identifier is a unique transaction identifier.

57. The article of manufacture of claim 39, wherein the transaction comprises a first operation with a first identifier and a second operation with a second identifier, and the first identifier equals the second identifier, the method further comprising, after system failure, preventing the second operation from undoing changes made to the first operation.

* * * * *